Patented Jan. 15, 1929.

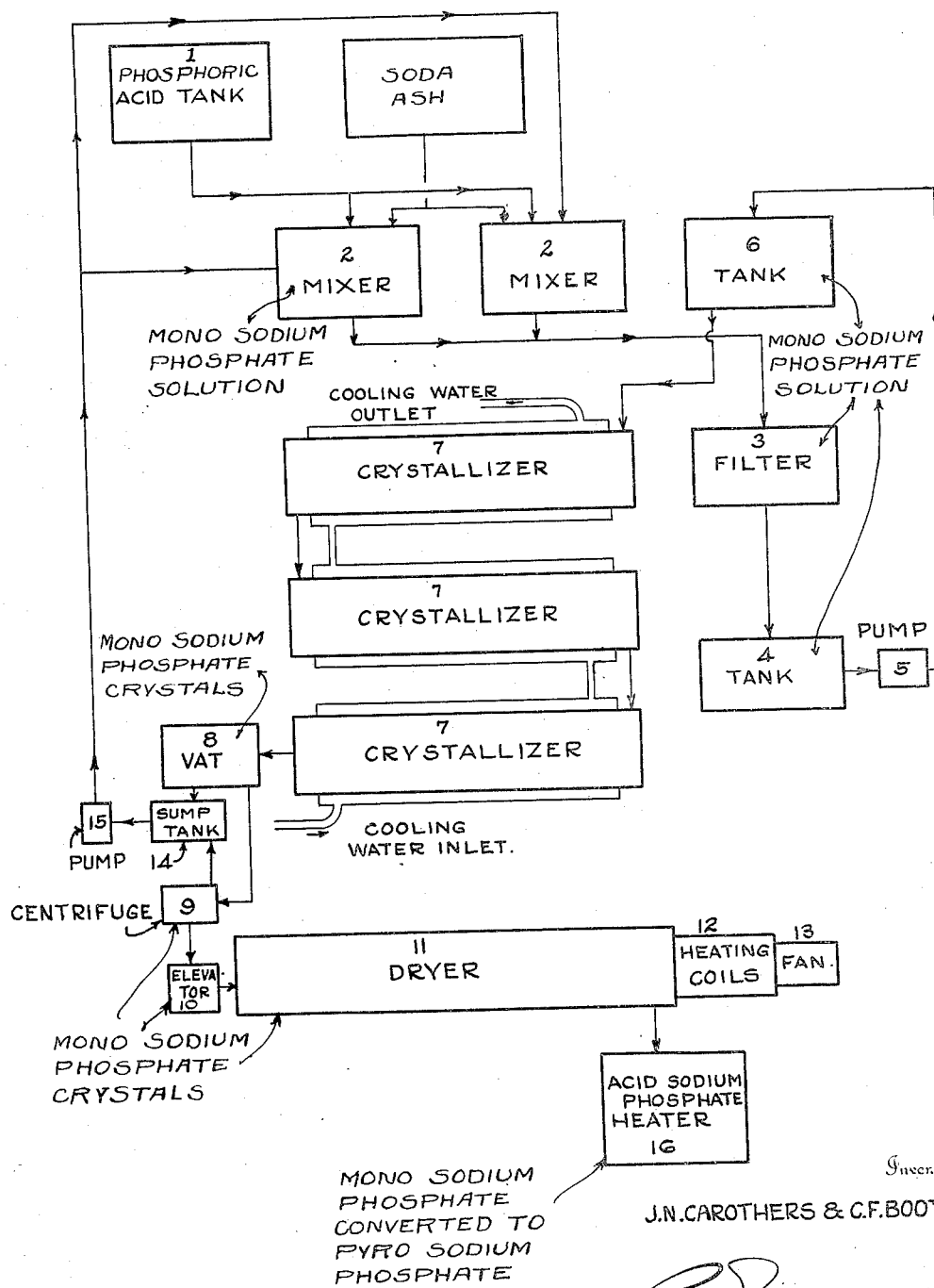

1,699,093

UNITED STATES PATENT OFFICE.

JOHN N. CAROTHERS AND CHARLES F. BOOTH, OF ANNISTON, ALABAMA, ASSIGNORS TO FEDERAL PHOSPHORUS COMPANY, OF BIRMINGHAM, ALABAMA, A CORPORATION OF ALABAMA.

PROCESS FOR THE PRODUCTION OF ACID SODIUM PYROPHOSPHATE.

Application filed January 13, 1926. Serial No. 81,100.

This invention relates to a process for the commercial crystallization of acid sodium orthophosphate the subsequent drying of the crystals to remove adhering moisture and water of crystallization therefrom and conversion of the acid sodium orthophosphate into acid sodium pyrophosphate.

It has for its object the production on a commercial basis of acid sodium pyrophosphate having a higher purity, and on a more economical basis than has been possible heretofore.

Acid sodium pyrophosphate is largely used as the source of acid ingredient in baking powders, baking mixtures, or like leavening agents. Besides supplying the acid ingredient, another characteristic which adapts acid sodium pyrophosphate to use as a leavening agent, is the delayed action when compared for instance with other acid phosphates, as acid phosphates, as acid sodium orthophosphate and acid calcium phosphate.

It is a well known and recognized fact that purification may be accomplished by crystallization. We therefore propose to take advantage of this principle; and in addition to using phosphoric acid of a higher purity and concentration than heretofore used, we propose using solutions of acid sodium phosphate having a concentration such that by cooling with water at atmospheric temperatures, we obtain crystals of acid sodium orthophosphate.

The acid we propose using may be produced by electric furnace smelting of a mixture of phosphate rock, silica and coke. Such a process which will produce an acid of the desired purity and concentration is described in United States Patent No. 1,410,550.

Prior to the development of our process, the production of acid sodium pyrophosphate has been from phosphoric acid produced by the treatment of phosphates (generally calcined bone, or phosphate rock) with sulfuric acid. This method of producing phosphoric acid yields only a dilute acid, i. e., an acid of such concentration that crystals of acid sodium orthophosphate could not be obtained when the acid was neutralized with an alkali metal compound, as sodium carbonate for instance, and subsequently cooled to atmospheric temperatures. Further, in the production of phosphoric acid by the treatment of a phosphate with sulfuric acid, a large percentage of impurities are obtained, which must be eliminated before the neutralization step took place. Then, in the concentration of the dilute phosphoric acid great difficulty was experienced in the corrosive action of the hot phosphoric acid on the materials of construction. It is well known that alkali metal phosphate solutions are less corrosive than phosphoric acid. For these reasons the method of production of acid sodium pyrophosphate consisted in neutralizing the purified dilute phosphoric acid with sodium carbonate, or adding dilute phosphoric acid to crystals of di-sodium phosphate ($Na_2HPO_4 \cdot 12H_2O$) and subsequently concentrating the resultant mass to a thick pasty consistency, when it was transferred to heaters where the temperature was increased, and heating continued until a dried or anhydrous product was obtained. After dehydration was completed the mass was further heated to convert the anhydrous acid sodium orthophosphate into acid sodium pyrophosphate.

In our process the operation is materially simplified and the cost of production substantially lowered. In carrying out our process we proceed in the following manner: Phosphoric acid of approximately 61% $H_3PO_4$ is neutralized with sodium carbonate (ordinary soda ash of approximately 58% $Na_2O$), using methyl orange as an indicator. As illustrative of the grade of acid required to produce a crystal of the desired purity, iron and aluminum phosphates may be present without being objectionable up to 0.5%, but, when iron and aluminum phosphates are present in quantities in excess of 0.6%, a precipitate of iron and aluminum phosphate will be observed in the solution and as a result the product will be contaminated. While there will be an increase in the iron and aluminum phosphate contained in the crystals when the acid contains percentages between 0.5% and 0.6%, the formation of a precipitate in the solution will be observed only occasionally, and then either with lowered specific gravity, or temperature. If acid of higher concentration than 61% is employed, it is advisable to dilute it to the above mentioned percentage before adding the soda ash. After the neutralization step the solution is diluted to approximately 1.56 specific gravity at 55° C., in case the specific gravity has exceeded this during neutralization. The solution is then passed through a filter to remove all solid matter which may have been introduced with the soda ash. From the filter the solution is pumped into a receiving tank where it is kept at approximately 55° C. until it is fed into the crystallizer. Any number of standard crystallizers may be employed; however, we have found that a series of water cooled troughs with a spider or framework revolving in the solution is a very satisfactory method of producing crystals. The acid sodium phosphate solution travels through the series of troughs counter-current to the flow of the cooling water in the outside shell. In this way the crystals and mother liquor leave the crystallizer at a temperature approximately that of the incoming cooling water, and therefore maximum cooling effect is obtained. The crystals and mother liquor are discharged from the crystallizer into a vat where the surplus mother liquor drains off into the sump tank, whence it is returned to the mixers. After the crystals have drained sufficiently, they are transferred to a centrifuge of any standard make, to remove additional mother liquor. When the crystals have been "centrifuged" they are discharged into the boot of an elevator which transfers them to the cool end of a rotary dryer or other suitable means of drying. In case a rotary dryer is used the air enters the dryer at approximately 150° C. and is discharged into the stack at approximately 40° C. The air is heated by passing over steam coils or any other well known means of heating air. The crystals may be dried only sufficiently to remove the surface moisture, or to partially remove the water of crystallization, or to completely dehydrate, according to the desired use to which the crystals will be subsequently put.

It is possible to place the crystals in pans, as they are discharged from the centrifuge, and to heat them to a suitable temperature for converting into acid sodium pyrophosphate. Approximately 460° F. is the desired temperature for conversion into acid sodium pyrophosphate; and this temperature will require about 8 hours for complete conversion. This time will vary with the time required to bring the mass up to temperature and the quantity of heat supplied. In case the crystals are melted and heated up directly a hard flinty mass is formed when completely dehydrated and converted into acid sodium pyrophosphate. This mass must be removed from the trays or pans and ground so that it will all pass through a 100 mesh screen before it is suitable for use as a baking ingredient. In case dehydrated crystals are produced by means of a rotary dryer, they may be converted into acid sodium pyrophosphate, by placing them in pans or trays similar to those used in converting the hydrate crystals and heating them to approximately 460° F. for about 8 hours. In the latter case they do not form a hard mass, and are more easily handled and pulverized.

It has been found that ordinary commercial iron plate may be used in the construction of the crystallizer, without detrimental effect to the purity of the crystals, or serious corrosive action on the metal of the crystallizer. There appears to be a passive action on the metal at the temperature used, and this is believed the explanation as to why iron may be used. Likewise iron may be used for the vat where the crystals drain, and the pump and piping for the return of the mother liquor to the mixers. The basket of the centrifuge should be covered with a protective rubber coating. It has been observed, in ordinary iron as is commonly used for this construction, that the holes tend to enlarge and permit crystals to pass into the mother liquor. Since the phosphoric acid is cold, it may satisfactorily be stored in a lead lined tank. The mixer tanks are brick lined using an acid proof cement for two reasons:

1. To conserve the heat of reaction and prevent the need of other means of heating.
2. To provide a simple means of eliminating such corrosive action as occurs while the soda ash is being added to the phosphoric acid.

In the accompanying drawings I have diagrammatically illustrated a suitable apparatus for the practice of this process. In the drawings I have provided an acid tank 1 for the storage of the acid to be fed to the mixers 2 which are alternately operated and from which under suitable control the solution is fed to the filter 3 and flows thence to the tank 4. From this tank it is elevated by a pump 5 to the receiving tank 6 where it is kept to provide a uniform feed to the crystallizers 7. After passing through the crystallizers, the crystals and mother liquor are discharged into a vat 8, whence, after draining, they are transferred to the centrifuge 9, for further de-watering, before being transferred by the elevator 10 to the dryer 11 through which a stream of warm air is caused to flow over the heating coils 12 by means of a fan 13. The mother liquor from the vat 8 and the centrifuge 9 passes into a sump tank 14 from which it is returned by a pump 15 to the mixers 2 for use in subsequent mixes. The dehydrated crystals are discharged from the dryer 11 and are placed in suitable trays or pans for introduction into the heater 16 where the acid sodium orthophosphate is converted into acid sodium pyrophosphate. Other means of conversion may be employed, but this is given merely as an illustration of suitable equipment.

Having thus described our invention, what we claim as new and desire to secure by Letters Patent, is:—

1. An improvement in the commercial production of acid sodium pyrophosphate, which consists in adding an alkali metal compound to phosphoric acid until neutral to methyl orange indicator, crystallizing acid sodium orthophosphate from said solution, removing said crystals from adhering mother liquor, and converting said crystals into acid sodium pyrophosphate, substantially as described.

2. An improvement in the commercial production of acid sodium pyrophosphate, which consists in adding sodium carbonate to approximately 61% phosphoric acid until neutral to methyl orange indicator, cooling said resultant solution, crystallizing acid sodium orthophosphate from said solution, separating said crystals from adhering mother liquor, dehydrating and converting said crystals into acid sodium pyrophosphate substantially as described.

3. An improvement in the commercial production of acid sodium pyrophosphate, which consists in adding sodium carbonate to approximately 61% phosphoric acid until neutral to methyl orange indicator, diluting said solution to approximately 1.56 specific gravity, cooling said resultant solution to approximately atmospheric temperature, crystallizing acid sodium orthophosphate from said solution, separating said crystals from adhering mother liquor, dehydrating and converting said crystals into acid sodium pyrophosphate, substantially as described.

4. An improvement in the commercial production of acid sodium pyrophosphate, which consists in adding sodium carbonate to approximately 61% phosphoric acid containing not exceeding 0.6% iron and aluminum phosphates until neutral to methyl orange indicator, cooling said resulting solution and crystallizing acid sodium orthophosphate, removing said crystals from adhering mother liquor, dehydrating and converting said crystals into acid sodium pyrophosphate, and grinding said acid sodium pyrophosphate substantially as described.

5. An improvement in the commercial production of acid sodium pyrophosphate, which consists in adding sodium carbonate to approximately a 61% phosphoric acid solution containing not exceeding 0.6% iron and aluminum phosphates, until neutral to methyl orange indicator, removing any solid matter from said sodium phosphate solution, cooling said solution to form crystals of acid sodium orthophosphate, separating said crystals from adhering mother liquor, dehydrating said crystals, and subsequently heating said anhydrous acid sodium orthophosphate to approximately 460° F. whereby substantially all of said acid sodium orthophosphate is converted into acid sodium pyrophosphate and grinding said pyrophosphate, substantially as described.

In testimony whereof we affix our signatures.

JOHN N. CAROTHERS.
CHARLES F. BOOTH.